(12) United States Patent
Kawano

(10) Patent No.: US 6,287,196 B1
(45) Date of Patent: Sep. 11, 2001

(54) METHOD OF ANALYZING PERSONALITY COMPATIBILITY WITH GAME CHARACTER, VIDEO GAME APPARATUS AND STORAGE MEDIUM THEREFOR

(75) Inventor: Junko Kawano, Tokyo (JP)

(73) Assignee: Konami Co., Ltd. (JP)

( * ) Notice: Subject to any disclaimer, the term of this patent is extended or adjusted under 35 U.S.C. 154(b) by 0 days.

(21) Appl. No.: 09/145,591

(22) Filed: Sep. 2, 1998

(30) Foreign Application Priority Data

Sep. 4, 1997 (JP) .................................................. 9-239383

(51) Int. Cl.[7] ................................ A63F 13/00; A63F 9/16
(52) U.S. Cl. ...................................... 463/23; 463/1; 463/9; 463/30; 463/37; 463/43; 273/148 B; 273/430; 434/236
(58) Field of Search .................................. 463/1, 23, 8, 9, 463/30, 37; 273/148 B, 429–432; 434/236–238; 345/339, 474; 395/613; 704/270; 705/10

(56) References Cited

U.S. PATENT DOCUMENTS

| | | | | |
|---|---|---|---|---|
| 4,445,187 | * | 4/1984 | Best ........................................ | 463/31 |
| 5,020,804 | * | 6/1991 | Weedman .......................... | 273/118 R |
| 5,112,064 | * | 5/1992 | Weedman .............................. | 273/429 |
| 5,358,259 | * | 10/1994 | Best ..................................... | 273/434 |
| 5,393,071 | * | 2/1995 | Best ..................................... | 273/434 |
| 5,393,072 | * | 2/1995 | Best ..................................... | 273/434 |
| 5,393,073 | * | 2/1995 | Best ..................................... | 273/434 |
| 5,395,110 | * | 3/1995 | Yamazaki et al. ................... | 273/108 |
| 5,696,981 | * | 12/1997 | Shovers ................................ | 434/236 |
| 5,885,156 | * | 3/1999 | Toyohara et al. ........................ | 463/1 |
| 5,938,531 | * | 8/1999 | Yasushi et al. ......................... | 463/36 |
| 5,954,581 | * | 9/1999 | Ohta et al. ................................ | 463/9 |
| 6,024,643 | * | 2/2000 | Begis ..................................... | 463/42 |
| 6,106,395 | * | 8/2000 | Begis ..................................... | 463/23 |

FOREIGN PATENT DOCUMENTS

| | | | |
|---|---|---|---|
| 06168314 | * | 11/1992 | (JP) . |
| 07178234 | * | 12/1993 | (JP) . |
| A-06168314 | | 6/1994 | (JP) . |
| A-07178234 | | 7/1995 | (JP) . |
| 08309033 | * | 11/1996 | (JP) . |
| A-08309032 | | 11/1996 | (JP) . |
| A-08309033 | | 11/1996 | (JP) . |

* cited by examiner

Primary Examiner—Jessica J. Harrison
Assistant Examiner—Yveste G. Cherubin
(74) Attorney, Agent, or Firm—Lerner, David, Littenberg, Krumholz & Mentlik, LLP

(57) ABSTRACT

During a game, options are offered to a player per scene. Point values are assigned to the options for updating favorable impression point values each representing a player's degree of favorable impression toward corresponding one of counterpart characters subjected to personality compatibility analysis. Every time the player chooses one of the options, the corresponding favorable impression point value is updated by the assigned point value. In response to a given command input from the player, one of the counterpart characters having the highest favorable impression point value is selected and offered to the player.

18 Claims, 7 Drawing Sheets

| GIRL A (pa) | GIRL B (ma) | GIRL C (mo) | GIRL D (fi) | GIRL E (sa) | MAN A (wa) | MAN B (si) |
|---|---|---|---|---|---|---|
| 100 | 70 | 60 | 50 | 60 | 50 | 50 |

(a) GIRL A  (b) GIRL B  (c) GIRL C  (d) GIRL D  (e) GIRL E  (f) MAN A  (g) MAN B

FIG. 5

```
" What on earth are all these girls ? "     ···mo-10 , fi-10

" Girl C ··· She's my type . "              ···fi-10

" Girl D ··· She's cute . "                 ···mo-10

------ OPTION ------
```
— scene-:-Station , Ticket booth (outside)

FIG. 6

```
" She's just a kid . Doesn't interest me . "    ···0
" Those two don't seem to have any problems
  with each other . "                           ···pa-5
" i give up . "                                 ···pa-10

------ OPTION ------
```
— scene-:-Park with Sunset (with girl A)

FIG. 7

```
" He's no big deal . "              ···wa-10

" So what the information ? "       ···wa-5

------ OPTION ------
```
— scene-:-Fight Scene with Sunset (with man A)

FIG. 8

" I see . "    ···0

" Girl E , I knew how you really felt . "    ···sa-5

" I'm sleepy ··· I want to go home . "    ···sa-20

OPTION scene-:-On an Island (with girl E)

FIG. 9A

Girl A at a party - result is Girl A

Girl A " Hah , hah ,hah . That's too cruel a joke ··· Really ? "

FIG. 9B

Girl A at a party - result is not Girl A

Girl A " Wow ··· can't afford to ignore Player B . "

FIG. 9C

Girl E at a party - result is Girl E

Girl E " Well ··· I really don't belive in fortune telling . "

FIG. 9D

Girl E at a party - result is not Girl E

Girl E " Well ··· Is that so ? "

METHOD OF ANALYZING PERSONALITY COMPATIBILITY WITH GAME CHARACTER, VIDEO GAME APPARATUS AND STORAGE MEDIUM THEREFOR

BACKGROUND OF THE INVENTION

1. Field of the Invention

The present invention relates to a method of analyzing the personality compatibility using a video game apparatus and, more specifically, to a technique for automatically choosing a player's favorite game character based on choices casually made by the player in response to questions offered in a role-playing game (RPG).

2. Description of the Prior Art

There have been known personality compatibility analyses using computers as described in, for example, JP-A-6-168314, JP-A-7-178234 and JP-A-8-309033. In these personality compatibility analyses, features of images of faces or the palm lines of players are analyzed to judge the personality compatibility therebetween based on the analysis result and the stereotypical analysis data. JP-A-8-309032 further describes a technique for analyzing the personality compatibility between game characters provided in advance.

In the foregoing conventional personality compatibility analyses, however, since the personality compatibility is analyzed based on the stereotypical analysis data, the player is likely to be bored after having experienced it several times.

SUMMARY OF THE INVENTION

Therefore, it is an object of the present invention to provide a method of analyzing the personality compatibility between a player and game characters on a non-stereotypical basis.

It is another object of the present invention to provide a video game apparatus for carrying out the foregoing personality compatibility analyzing method.

It is another object of the present invention to provide a storage medium storing a game program representing the foregoing personality compatibility analyzing method.

According to one aspect of the present invention, there is provided, in a video game apparatus wherein a player character operated by a player and a plurality of counterpart characters subjected to personality compatibility analysis appear and a plurality of options associated with at least part of the counterpart characters are offered to the player per scene, a method comprising the steps of setting in advance favorable impression point values representing degrees of favorable impression toward the counterpart characters, respectively; assigning point values to at least part of the options for reducing the corresponding favorable impression point values; reducing, every time the player chooses one of the options, the corresponding favorable impression point value by the assigned point value; and selecting, in response to a given command input, one of the counterpart characters depending on the remaining favorable impression point values.

According to another aspect of the present invention, there is provided, in a video game apparatus wherein a player character operated by a player and a plurality of counterpart characters subjected to personality compatibility analysis appear and a plurality of options associated with at least part of the counterpart characters are offered to the player per scene, a method comprising the steps of setting in advance favorable impression point values representing degrees of favorable impression toward the counterpart characters, respectively; assigning point values to at least part of the options for increasing the corresponding favorable impression point values; increasing, every time the player chooses one of the options, the corresponding favorable impression point value by the assigned point value; and selecting one of the counterpart characters depending on the favorable impression point values upon an input of a given command.

It may be arranged that the options include an option assigned a point value ignoring personality compatibility and, when the option is chosen by the player, the favorable impression point value corresponding to one of the counterpart characters which is weird is increased.

According to another aspect of the present invention, there is provided a video game apparatus wherein a player character operated by a player and a plurality of counterpart characters subjected to personality compatibility analysis appear and a plurality of options associated with at least part of the counterpart characters are offered to the player per scene, the apparatus comprising an option managing section assigning point values to at least part of the options for updating corresponding favorable impression point values each representing a degree of favorable impression toward corresponding one of the counterpart characters, an impression point storage section storing the favorable impression point value per counterpart character; an impression point managing section which updates the favorable impression point values stored in the impression point storage section based on the point values assigned to the options chosen by the player, respectively; and a character selecting section selecting one of the counterpart characters depending on the favorable impression point values upon an input of a given command.

It may be arranged that the video game apparatus further comprises a section which offers to the player at least one of the selected counterpart character and the remainder of the counterpart characters and words corresponding to the at least one.

According to another aspect of the present invention, there is provided a storage medium storing a game program which allows a computer with a display unit to work as a video game apparatus when executed by the computer, the game program allowing the computer to execute the steps of displaying on the display unit a player character operated by a player and a plurality of counterpart characters subjected to personality compatibility analysis and offering per scene a plurality of options associated with at least part of the counterpart characters; setting favorable impression point values representing degrees of favorable impression toward the counterpart characters, respectively; assigning point values to at least part of the options for reducing the corresponding favorable impression point values; reducing, every time the player chooses one of the options, the corresponding favorable impression point value by the assigned point value; and selecting one of the counterpart characters depending on the remaining favorable impression point values at a given time point.

According to another aspect of the present invention, there is provided a storage medium storing a game program which allows a computer with a display unit to work as a video game apparatus when executed by the computer, the game program allowing the computer to execute the steps of displaying on the display unit a player character operated by a player and a plurality of counterpart characters subjected to personality compatibility analysis and offering per scene a plurality of options associated with at least part of the counterpart characters; setting favorable impression point values representing degrees of favorable impression toward the counterpart characters, respectively; assigning point values to at least part of the options for increasing the corresponding favorable impression point values; increasing, every time the player chooses one of the options, the corresponding favorable impression point value by the assigned point value; and selecting one of the counterpart characters depending on the favorable impression point values at a given time point.

It may be arranged that the game program allows the computer to further execute the step of increasing the favorable impression point value of one of the counterpart characters selected at random.

It may be arranged that the game program allows the computer to further execute the step of carrying out a particular event between the selected counterpart character and the player character.

It may be arranged that the game program allows the computer to further execute the step of offering to the player at least one of the selected counterpart character and the remainder of the counterpart characters and words corresponding to the at least one.

BRIEF DESCRIPTION OF THE DRAWINGS

The present invention will be understood more fully from the detailed description given hereinbelow, taken in conjunction with the accompanying drawings.

In the drawings:

FIG. 5 is an explanatory diagram showing an example of options assigned impression point decreasing expressions, respectively;

FIG. 6 is an explanatory diagram showing another example of options assigned impression point decreasing expressions, respectively, with one of them assigned no such an impression point decreasing expression;

FIG. 7 is an explanatory diagram showing another example of options assigned impression point decreasing expressions, respectively;

FIG. 8 is an explanatory diagram showing another example of options assigned impression point decreasing expressions, respectively, with one of them assigned no such an impression point decreasing expression;

FIGS. 9A to 9D are diagrams showing examples of words, wherein FIG. 9A shows the words of girl A when girl A is selected, FIG. 9B shows the words of girl A when other than girl A is selected, FIG. 9C shows the words of girl E when girl E is selected, and FIG. 9D shows the words of girl E when other than girl E is selected;

DESCRIPTION OF THE PREFERRED EMBODIMENT

Now, a preferred embodiment of the present invention will be described hereinbelow with reference to the accompanying drawings.

Figure 1:
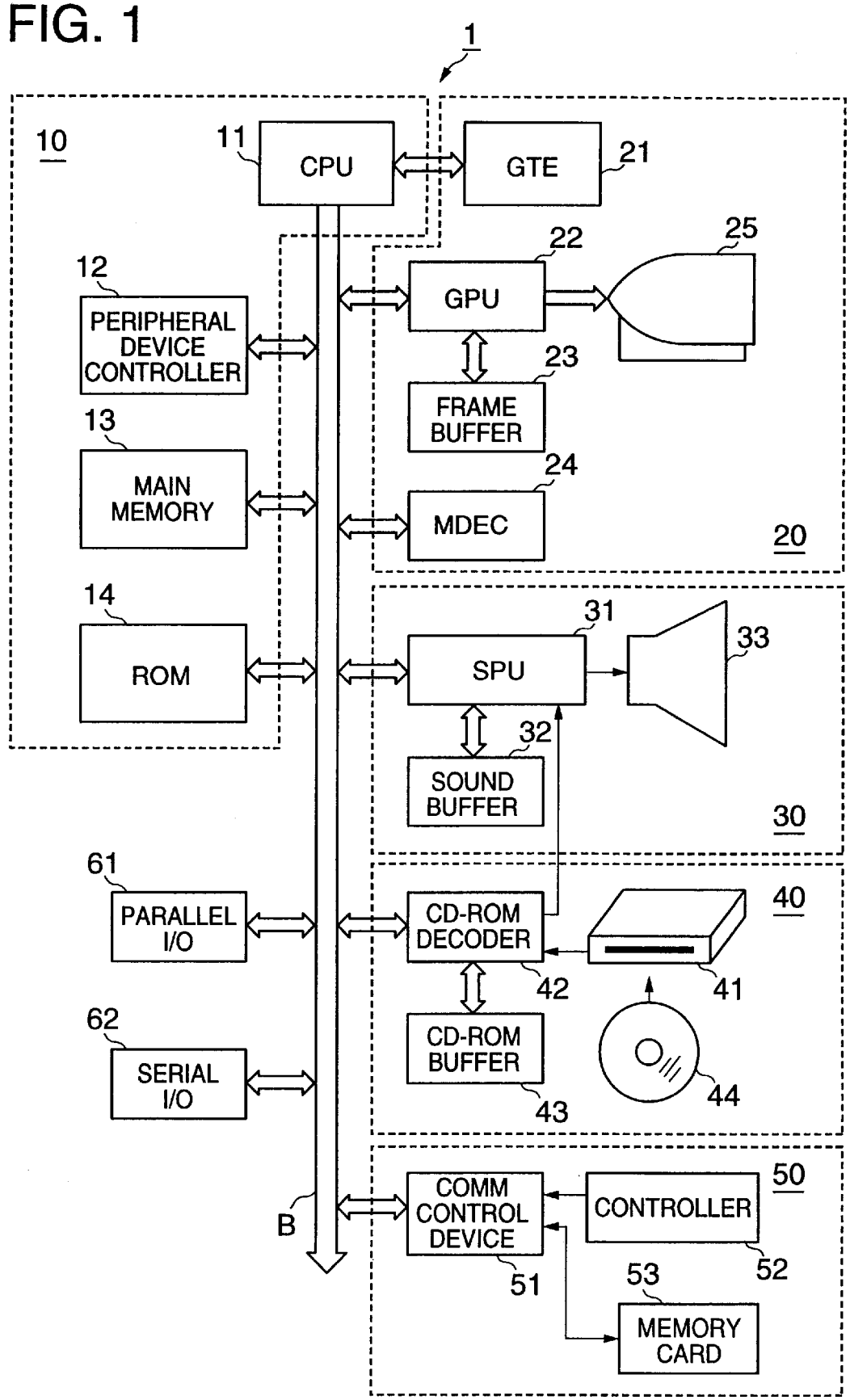
FIG. 1 is a block diagram showing a video game hardware structure which, cooperatively with a storage medium storing a characteristic game program, constitutes a video game apparatus according to a preferred embodiment of the present invention.

Referring to FIG. 1, a video game hardware structure which, cooperatively with a storage medium storing a characteristic game program, constitutes a video game apparatus according to the preferred embodiment of the present invention.

The hardware structure reads out a game program (in the following description, the game program also includes necessary image data and control parameters) from a CD-ROM as one example of the storage medium and executes it so as to carry out displaying and controlling of behavior of a player character depending on commands from a player, behavior of counterpart characters, behavioral environments around the player character and so forth.

As shown in FIG. 1, the hardware structure 1 comprises a main control section 10, an Image processing section 20, a sound processing section 30, a disk control section 40, a communication control section 50 and a main bus B connecting the foregoing functional blocks 10 to 50 to allow two-way communications among them.

The main control section 10 comprises a CPU 11, a peripheral device controller 12 for carrying out an interrupt control, a DMA (direct memory access) transfer control, etc., a main memory 13 for temporarily storing a game program read out from a CD-ROM 44, and a ROM 14 storing an operating system (OS) etc. for managing the image processing section 20, the sound processing section 30, etc. The CPU 11 is a RISC (reduced instruction set computer) CPU, executing the OS stored in the ROM 14 to control the basic operation of the whole apparatus and further executing the game program stored in the main memory 13 to realize a plurality of functional blocks which will be described later.

The image processing section 20 comprises a geometry transfer engine (GTE) 21 carrying out high-speed coordinate transformation. relative to data stored in the main memory 13 and so forth, a graphics processing unit (GPU) 22 for drawing polygons, such as triangles and quadrilaterals, and sprites according to drawing commands from the CPU 11 so as to form images of various characters and environments, a frame buffer 23 for storing the images drawn by the GPU 22, and an image decoder (MDEC) 24 for decoding compressed image data according to necessity. A display unit 25 reads out data stored in the frame buffer 23 and displays them.

The sound processing section 30 comprises a sound processing unit (SPU) 31 for producing game sounds, sound effects, etc. according to commands from the CPU 11, a sound buffer 32 for storing voice data, sound data, tone generator data, etc. read out from the CD-ROM 44, and a loudspeaker 33 for outputting the game sounds, the sound effects, etc. produced at the SPU 31. The SPU 31 has an ADPCM decoding function of, for example, reproducing voice data from 4-bit differential signals obtained by applying adaptive differential pulse code modulation (ADPCM) to 16-bit voice data, a function of producing sound effects by reproducing tone generator data stored in the sound buffer 32, a modulating function of modulating and reproducing voice data etc. stored in the sound buffer 32, and so forth. Given such functions, the SPU 31 can be used as a sampling tone generator for producing musical sounds, sound effects, etc. based on voice data etc. stored in the sound buffer 32 according to commands from the CPU 11.

The disk control section 40 comprises a disk drive 41 for reproducing a game program stored in the CD-ROM 44, a CD-ROM decoder 42 for decoding data added with an error correcting code (ECC), and a CD-ROM buffer 43 for temporarily storing reproduced. data from the disk drive 41. The CD-ROM decoder 42 constitutes part of the sound processing section 30.

Voice data stored in the CD-ROM 44 and read out at the disk drive 41 include, other than the foregoing ADPCM data, so-called PCM data obtained by applying analog-to-digital conversion to voice signals. Voice data stored as ADPCM data and representing, for example, differentials of 16-bit digital data by 4 bits is subjected to error correction and decoding at the CD-ROM decoder 42, then fed to the SPU 31 for digital-to-analog conversion etc., and thereafter used to drive the loudspeaker 33. On the other hand, voice data stored as PCM data in the form of, for example, 16-bit digital data is decoded at the CD-ROM decoder 42 and then used to drive the loudspeaker 33. An audio output from the CD-ROM decoder 42 is once inputted into the SPU 31 where it is mixed with an SPU output, and then inputted into a reverb unit so as to be a final audio output.

The communication control section 50 comprises a communication control device 51 for controlling communication with the CPU 11 via the main bus B, a controller 52 and a memory card 53. The controller 52 is an interface for inputting commands from the player and includes a start key for commanding the start or restart of a game, a reset key for commanding the reset of the game, a selection key for commanding movement of a player character in vertical and lateral directions and moving a cursor to desired one of menus or items, a command key for commanding detailed behavior of the player character and commanding a selected menu, and so forth. The controller 52 transmits the state of each key to the communication control device 51 in synchronous communication. The communication control device 51 notifies the state of each key of the controller 52 to the CPU 11. In this fashion, the commands from the player are given to the CPU 11 so that the operation is carried out according to an intention of the player.

If the setting of a game on execution, the final or intermediate result of the game or the like needs to be stored, the CPU 11 sends the necessary data to the communication control device 51 which then stores the data from the CPU 11 into the memory card 53. Since the memory card 53 is separated from the main bus B, it can be loaded or unloaded with the power being on. Accordingly, the setting of the game etc. can be stored in a plurality of memory cards 53.

The hardware structure 1 further comprises a parallel input/output (I/O) port 61 and a serial input/output (I/O) port 62. connected to the main bus B, respectively. Connection to a peripheral device can be achieved via the parallel I/O port 61, while connection to another video game apparatus can be achieved via the serial I/O port 62.

Figure 2:
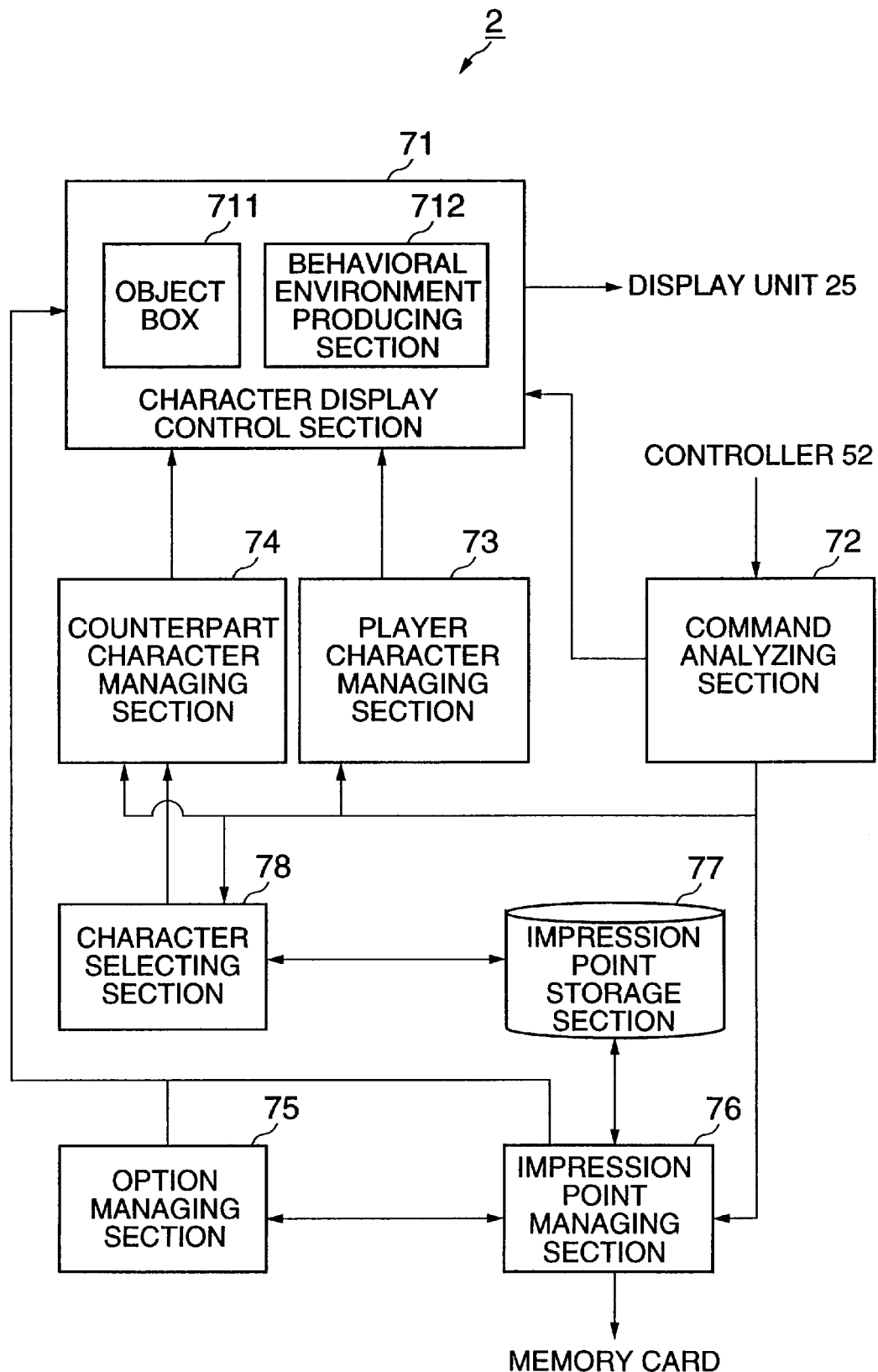
FIG. 2 is a functional block diagram of the video game apparatus according to the preferred embodiment of the present Invention.

In the foregoing hardware structure 1, when the power gets on or a reset process is executed while the CD-ROM 44 is loaded in the disk drive 41, the CPU 11 executes the OS stored in the ROM 14 to first initialize the whole apparatus, then control the disk control section 40 to read out the game program stored in the CD-ROM 44 and transfer it into the main memory 13, and then execute it. Through the execution of the game program, the CPU 11 realizes the functional blocks as shown in FIG. 2 so that the video game apparatus generally designated at numeral 2 is presented.

Specifically, the video game apparatus 2 comprises functional blocks of a character display control section 71, a command analyzing section 72, a player character control section 73, a counterpart character control section 74, an option managing section 75, an impression point managing section 76, an impression point storage section 77 and a character selecting section 78.

The character display control section 71 holds at an object box 711 objects of a player character to be operated by a player and a plurality of counterpart characters. The character display control section 71 superimposes upon occasion the respective characters and option choosing Images from the option managing section 75, which will be described later, over the behavioral environments produced at a behavioral environment producing section 712 according to a game scenario and displays them on the display unit 25. The behavioral environments represent environments where the player character acts, such as shops, roads and other background environments.

The command analyzing section 72 analyzes commands from the controller 52 and carries out necessary controls. The commands from the controller 52 include, for example, a command for start/stop/restart/end of the game and a command for behavior of the player character, and further include selection of speech/ behavior of the player character based on a choice made by the player among a plurality of options. Further, the command analyzing section 72 loads into the main memory 13 the game program from the CD-ROM 44 and the saved data from the memory card 53 upon the start or restart of the game. Further, upon the stop or end of the game, the command analyzing section 72 saves game data, such as personality point values, scored up to then into the memory card 53.

When a command from the controller 52 as analyzed at the command analyzing section 72 is a command for behavior of the player character, the player character managing section 73 causes the player character on the display unit 25 to make a corresponding motion.

The counterpart character managing section 74 manages speech and behavior of each of the counterpart characters and autonomously controls the speech and behavior of each counterpart character not based on the player but based on an output of the character selecting section 78 which will described later.

Figures 3, 4:
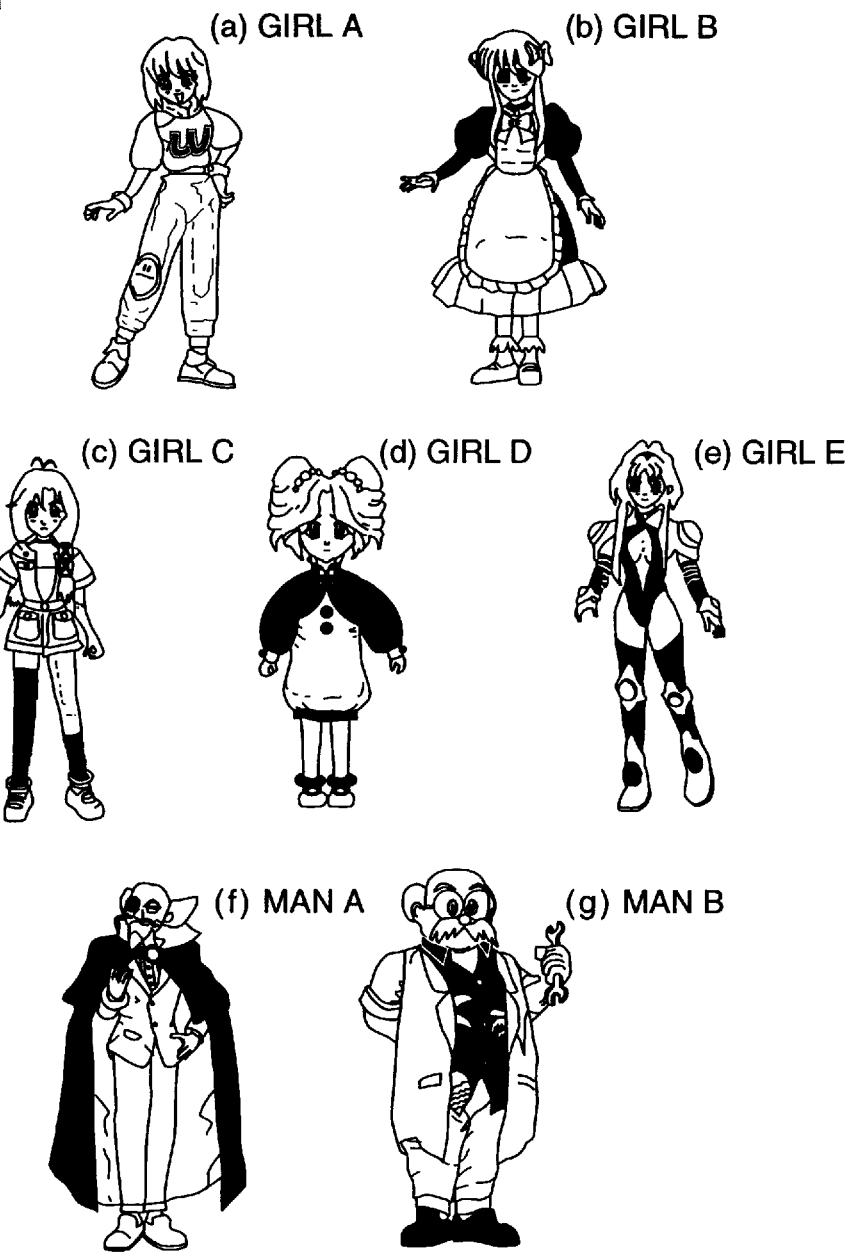
FIG. 3 is a diagram showing an example of the contents of an impression point storage section shown in FIG. 2.
FIG. 4 is a diagram for explaining counterpart characters which appear for analysis of the personality compatibility with a player.

In this embodiment, counterpart characters shown at (a) to (g) in FIG. 4 appear so as to be subjected to analysis of the personality compatibility with the player. In practice, proper names are given to the counterpart characters, respectively. However, in this embodiment, the counterpart characters are called girls A to E, man A and man B, respectively, for brevity of description. Girl A shown at (a) in FIG. 4 is a player character's right-hand partner who always ventures with the player character. Girl B shown at (b) in FIG. 4 is an owner of a coffee shop and a player character's good adviser. Girl C shown at (c) in FIG. 4 is a mysterious girl appearing at places where the player character goes. Girl D shown at (d) in FIG. 4 is a younger sister of girl C and also a mysterious girl. Girl E shown at (e) in FIG. 4 is a cyborg girl once fought with the player character. Man A shown at (f) in FIG. 4 is a wicked scientist contending against the player character. Man B shown at (g) in FIG. 4 is a scientific genius who is cooperative with the player character.

All the foregoing counterpart characters show their unique individualities while having something to do with the player character, so that entertainment of the personality compatibility analysis can be enhanced.

The option managing section 75 manages a plurality of options to be offered to the player. Point values are assigned to at least part of the foregoing options, respectively, for increasing or decreasing favorable impression point values indicative of the player's favorable impression degrees toward the corresponding counterpart characters.

Specifically, a point increasing expression for increasing a favorable impression point value relative to one of the foregoing counterpart characters is assigned per option, or a point decreasing expression for decreasing a favorable impression point value relative to one of the foregoing counterpart characters is assigned per option. The point increasing expressions are. used for gradually increasing the corresponding favorable impression point values from initial values (normally zero) so as to select one of the foregoing counterpart characters. Similarly, the point decreasing expressions are used for gradually reducing the corresponding favorable impression point values from initial values set to a given value, such as 100, so as to select one of the foregoing counterpart characters. As appreciated, both types of the expressions may be used together. Each of the point increasing expressions identifies one of the foregoing counterpart characters and includes a point value to be added to a favorable impression point value for the identified counterpart character. Similarly, each of the point decreasing expressions identifies one of the foregoing counterpart characters and includes a point value to be subtracted from a favorable impression point value for the identified counterpart character. For identification of the counterpart characters, "pa",t "ma", "mo", "fi", "sa", "wa" and "si" are used for girl A, girl B, girl C, girl D, girl E, man A and man B, respectively.

FIGS. 5 to 8 show examples of the options which are assigned point decreasing expressions, respectively. Accordingly, in these examples, every time one of the options is chosen by the player, a point value defined by an assigned point decreasing expression is subtracted from a favorable Impression point value for a counterpart character identified by the assigned point decreasing expression.

A point value in each point decreasing expression is normally determined depending on the contents of a corresponding option, but may be set to a random value. For example, assuming that a plurality of speeches of the same contents associated with the same counterpart character are made in various scenes, the point value may be changed per scene. Further, as appreciated from the figures, there may be included an option assigned a plurality of point decreasing expressions or an option assigned no such a point decreasing expression.

Further, although not shown in the figures, there is included a weird option assigned a point decreasing or increasing expression not considering the personality compatibility at all or intentionally deviating the personality compatibility. When this weird option is chosen, a weird character, such as man A or B, is liable to be selected as a counterpart character with the best personality compatibility.

Every time an option chosen by the player is detected via the command analyzing section 72, the impression point managing section 76 updates the corresponding favorable impression point value in the impression point storage section 77. Specifically, assuming that favorable impression point values shown in FIG. 3 are stored in the impression point storage section 77, every time the player chooses one of the options offered according to the game scenario, the impression point managing section 76 subtracts a corresponding point value managed at the option managing section 75 from the favorable impression point value of the corresponding counterpart character.

Although not shown in the figures, one of function items to be acquired by the player character during the game is designed, when used, to give a point value of about +5 to an unspecified counterpart character at random. Thus, when this function item is used, the impression point managing section 76 updates the corresponding favorable impression point value stored in the impression point storage section 77. In this case, the impression point managing section 76 notifies ex post facto the player via the character display control section 71 about the counterpart character to which the point value was given.

In response to an input of a personality compatibility check command from the player, the character selecting section 78 selects, based on the favorable impression point values stored in the impression point storage section 77, a counterpart character with the highest favorable impression point value as a counterpart character with the best personality compatibility with the player, and then notifies the counterpart character managing section 74 of the selected counterpart character and the non-selected counterpart characters.

In response thereto, via the character display control section 71, the counterpart character managing section 74 displays on the display unit 25 at least one of the selected and non-selected counterpart characters and causes it to speak words corresponding to the individuality thereof. Further, the counterpart character managing section 74 activates a particular event, such as a date event, with the player character and the selected counterpart character, controls the sound control section 30 to produce the sound effects and displays the event on the display unit 25 via the character display control section 71. Moreover, when the game scenario is finished, the counterpart character managing section 74 causes the selected counterpart character to speak additional words to the player.

In this embodiment, the foregoing personality compatibility check command from the player is inputted when the player character enters a divination mansion displayed as a behavioral environment in an image.

FIGS. 9A to 9D show examples of the foregoing words offered to the player, wherein FIG. 9A shows the words of girl A when girl A is selected, FIG. 9B shows the words of girl A when other than girl A is selected, FIG. 9C shows the words of girl E when girl E is selected, and FIG. 9D shows the words of girl E when other than girl E is selected. These words are spoken in a tone corresponding to the individuality of the character with the look thereof displayed on the display unit 25.

Now, a game procedure in the foregoing video game apparatus 2 will be described with reference to a flowchart shown in FIGS. 10 and 11.

Figure 10:
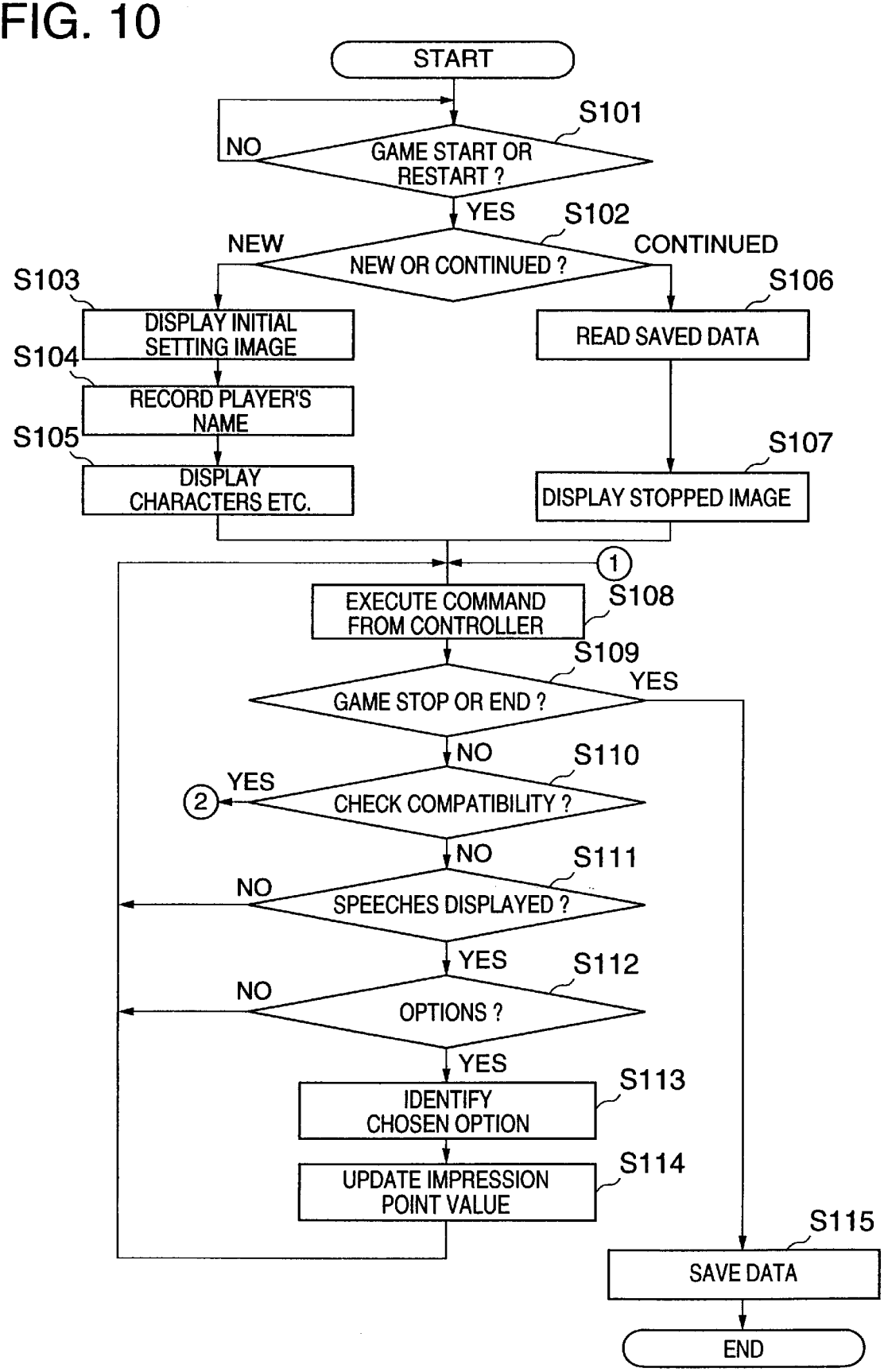
FIGS. 10 and 11 are diagrams showing a flowchart representing a game procedure according to the video game apparatus shown in FIG. 2.

In FIG. 10, when the start or restart of a game is commanded (Yes at step S101) via the controller 52, the command analyzing section 72 judges whether it is a new game or a continued game (step S102). If it is the new game, the command analyzing section 72 notifies it to the character display control section 71 which then displays an initial setting image for setting necessary items (step S103). Thereafter, a player's name is recorded (step S104), and images of the characters and behavioral environment are displayed (step S105). Now, the player can operate the player character and start the game via the controller 52. On the other hand, if it is the continued game as judged at step S102, saved data relating to the subject player are read out (step S106) so that a stopped image, that is, an image at the time of the game stop, is displayed (step S107). Accordingly, the player can restart the game from the time point of the game stop.

Subsequently, commands from the player via the controller 52 are carried out following the game scenario (step S108), and it is constantly monitored and checked whether the game stop or end is commanded (step S109) and whether a personality compatibility check is commanded (step S110).

If neither the game stop/end nor the personality compatibility check is commanded (No at steps S109 and S110), the contents of speeches are displayed (Yes at step S111). Then, if the displayed speech contents are optional (Yes at step S112), the impression point managing section 76 identifies an option chosen by the player (step S113) and updates (decreases) the corresponding favorable impression point value in the impression point storage section 77 according to an assigned point decreasing expression (step S114).

The foregoing processes are repeated until the game stop or end is commanded via the controller 52 (during No at step S109). If the game stop or end is commanded (Yes at step S109), data up to then is saved (step S115) and the routine is terminated.

Figure 11:
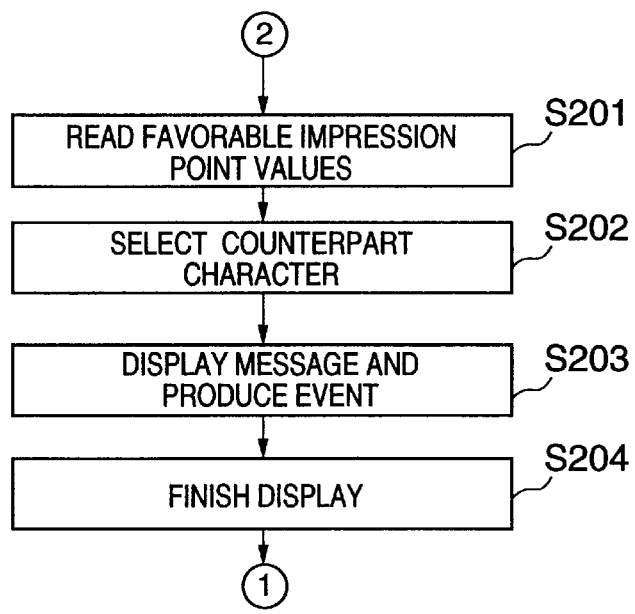
Figure 12:
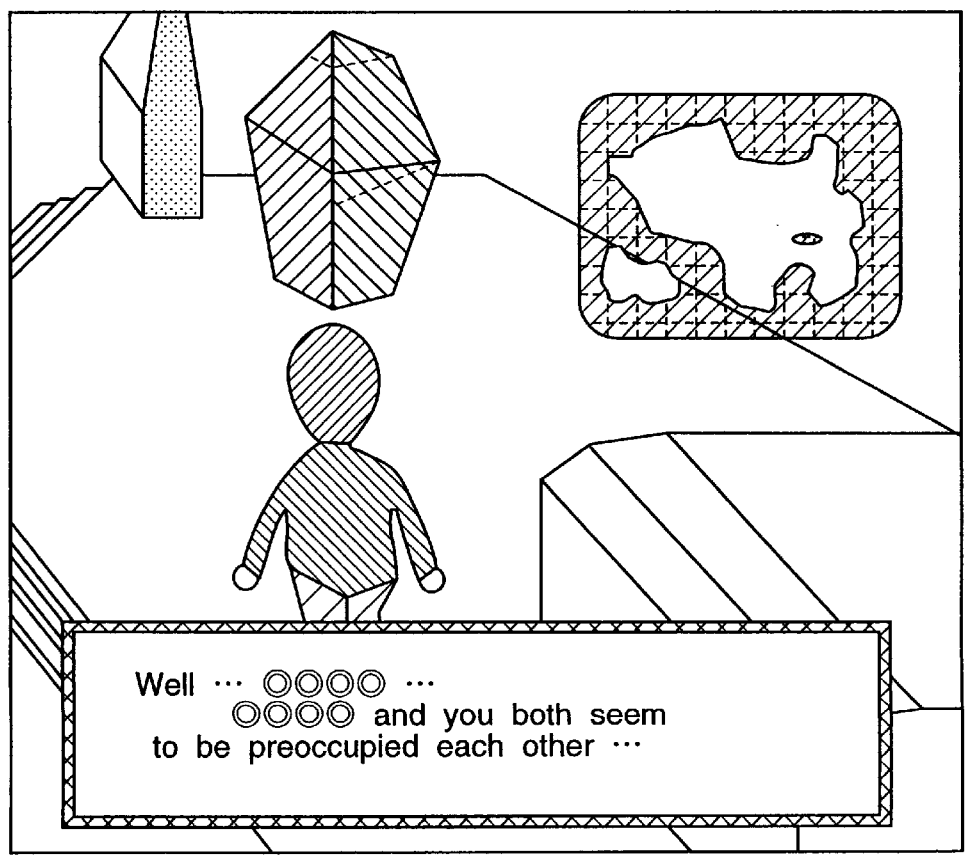
FIG. 12 is an explanatory diagram showing an example of a display image of a divination mansion for carrying out personality compatibility analysis.

FIG. 11 shows a procedure for carrying out the personality compatibility check requested at step S110 in FIG. 10, and FIG. 12 shows an example of an image display of the divination mansion where the personality compatibility check is performed.

Specifically, when the player character enters the divination mansion, the character selecting section 78 reads out the favorable impression point values from the impression point storage section 77 (step S201) and selects a counterpart character with the greatest favorable impression point value (step S202). Then, as shown in FIG. 12, the selection result and the analysis contents are displayed as the words of a fortune-teller (step S203). In response to a display finish command from the player via the controller 52, the routine returns to step S108 in FIG. 10 (step S204).

When the game scenario is finished, the counterpart character managing section 74 causes the selected counterpart character to be displayed and offer additional words to the player.

In the foregoing description, the counterpart character with the best personality compatibility is selected. On the other hand, it may be possible to select a counterpart character with the worst personality compatibility as the result of the personality compatibility analysis.

Further, it is possible to select counterpart characters with the best personality compatibility and the worst personality compatibility at the same time or selectively. This can be achieved, for example, by assigning the point decreasing expression and the point increasing expression to each of the options and by gradually decreasing from the initial value for selecting a counterpart character with the best personality compatibility and gradually increasing from the initial value for selecting a counterpart character with the worst personality compatibility.

Further, it may be possible to select a counterpart character with the lowest impression point value as a counterpart character with the best or worst personality compatibility.

Further, it may be possible to provide a priority order about counterpart characters in consideration of impression point values being even with each other.

As appreciated from the foregoing description, in the video game apparatus according to the preferred embodiment of the present invention, the counterpart character having the best or worst personality compatibility with the player can be selected based on the options casually chosen by the player during the game. Thus, the entertainment of the RPG can be enhanced. Further, by utilizing the foregoing storage medium storing the characteristic game program, the foregoing video game apparatus can be easily realized using a computer.

While the present invention has been described in terms of the preferred embodiments, the invention is not to be limited thereto, but can be embodied in various ways without departing from the principle of the invention as defined in the appended claims.

What is claimed is:

1. In a video game apparatus wherein a player character operated by a player and a plurality of counterpart characters subjected to personality compatibility analysis appear and a plurality of options associated with at least part of said counterpart characters are offered to the player per scene, a method comprising the steps of:

setting in advance favorable impression point values representing degrees of favorable impression toward said counterpart characters, respectively;

assigning point values to at least part of said options for reducing the corresponding favorable impression point values;

reducing, when the player chooses one of said options, the corresponding favorable impression point value by the assigned point value; and selecting, in response to a given command input, one of said counterpart characters depending on the remaining favorable impression point values.

2. The method according to claim 1, wherein said options include an option assigned a point value ignoring personality compatibility and, when said option is chosen by the player, the favorable impression point value corresponding to one of said counterpart characters is increased.

3. The method according to claim 1, wherein said step of reducing occurs every time the player chooses one of said options.

4. In a video game apparatus wherein a player character operated by a player and a plurality of counterpart characters subjected to personality compatibility analysis appear and a plurality of options associated with at least part of said counterpart characters are offered to the player per scene, a method comprising the steps of:

setting in advance favorable impression point values representing degrees of favorable impression toward said counterpart characters, respectively;

assigning point values to at least part of said options for increasing the corresponding favorable impression point values;

increasing, when the player chooses one of said options, the corresponding favorable impression point value by the assigned point value; and selecting one of said counterpart characters depending on said favorable impression point values upon an input of a given command.

5. The method according to claim 4, wherein said options include an option assigned a point value ignoring personality compatibility and, when said option is chosen by the player, the favorable impression point value corresponding to one of said counterpart characters is increased.

6. The method according to claim 4, wherein said step of increasing occurs every time the player chooses one of said options.

7. A video game apparatus wherein a player character operated by a player and a plurality of counterpart characters subjected to personality compatibility analysis appear and a plurality of options associated with at least part of said counterpart characters are offered to the player per scene, said apparatus comprising:

an option managing section assigning point values to at least part of said options for updating corresponding favorable impression point values each representing a degree of favorable impression toward corresponding one of said counterpart characters;

an impression point storage section storing said favorable impression point value per counterpart character;

an impression point managing section which updates said favorable impression point values stored in said impression point storage section based on said point values assigned to the options chosen by the player, respectively; and a character selecting section selecting one of said counterpart characters depending on said favorable impression point values upon an input of a given command.

8. The video game apparatus according to claim 7, further comprising a section which offers to the player at least one of the selected counterpart character and the remainder of said counterpart characters and words corresponding to said at least one.

9. A storage medium storing a game program which allows a computer with a display unit to work as a video game apparatus when executed by the computer, said game program allowing said computer to execute the steps of:

displaying on said display unit a player character operated by a player and a plurality of counterpart characters subjected to personality compatibility analysis and offering per scene a plurality of options associated with at least part of said counterpart characters;

setting favorable impression point values representing degrees of favorable impression toward said counterpart characters, respectively;

assigning point values to at least part of said options for reducing the corresponding favorable impression point values;

reducing, when the player chooses one of said options, the corresponding favorable impression point value by the assigned point value; and selecting one of said counterpart characters depending on the remaining favorable Impression point values at a given time point.

10. The storage medium according to claim 9, wherein said game program allows the computer to further execute the step of increasing the favorable impression point value of one of said counterpart characters selected at random.

11. The storage medium according to claim 9, wherein said game program allows the computer to further execute the step of carrying out a particular event between the selected counterpart character and the player character.

12. The storage medium according to claim 9, wherein said game program allows the computer to further execute the step of offering to the player at least one of the selected counterpart character and the remainder of said counterpart characters and words corresponding to said at least one.

13. The storage medium according to claim 9, wherein said step of reducing occurs every time the player chooses one of said options.

14. A storage medium storing a game program which allows a computer with a display unit to work as a video game apparatus when executed by the computer, said game program allowing said computer to execute the steps of:

displaying on said display unit a player character operated by a player and a plurality of counterpart characters subjected to personality compatibility analysis and offering per scene a plurality of options associated with at least part of said counterpart characters;

setting favorable impression point values representing degrees of favorable impression toward said counterpart characters, respectively;

assigning point values to at least part of said options for increasing the corresponding favorable impression point values:

increasing, when the player chooses one of said options, the corresponding favorable impression point value by the assigned point value; and selecting one of said counterpart characters depending on the favorable impression point values at a given time point.

15. The storage medium according to claim 14, wherein said game program allows the computer to further execute the step of increasing the favorable impression point value of one of said counterpart characters selected at random.

16. The storage medium according to claim 14, wherein said game program allows the computer to further execute the step of carrying out a particular event between the selected counterpart character and the player character.

17. The storage medium according to claim 14, wherein said game program allows the computer to further execute the step of offering to the player at least one of the selected counterpart character and the remainder of said counterpart characters and words corresponding to said at least one.

18. The storage medium according to claim 14, wherein said step of increasing occurs every time the player chooses one of said options.

* * * * *